J. N. MOODY.
TRACTOR.
APPLICATION FILED OCT. 29, 1915.
1,204,299.
Patented Nov. 7, 1916.
2 SHEETS—SHEET 1.
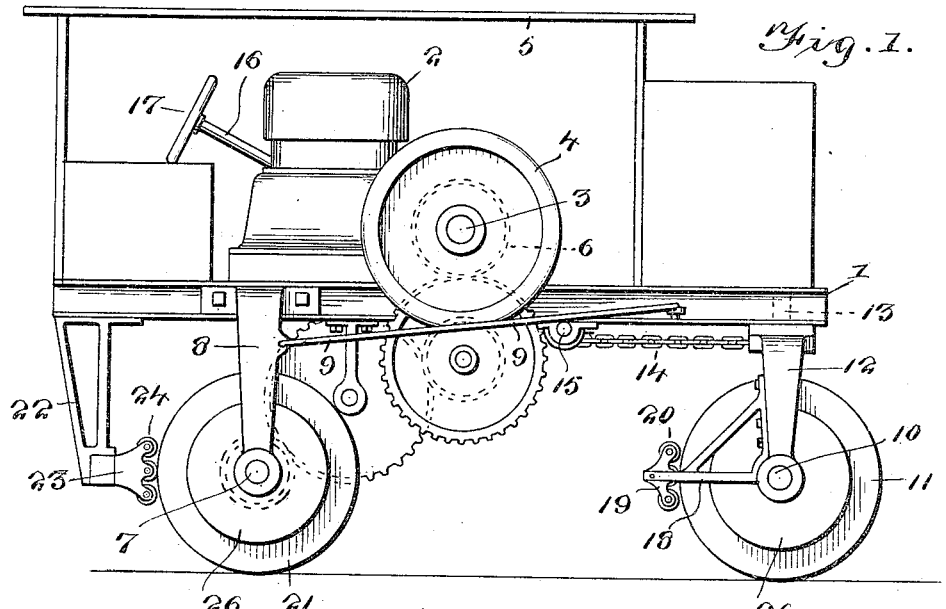
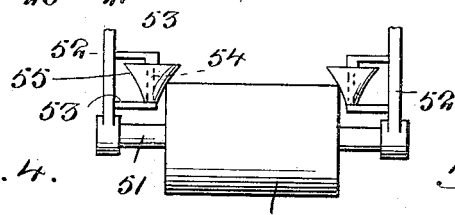
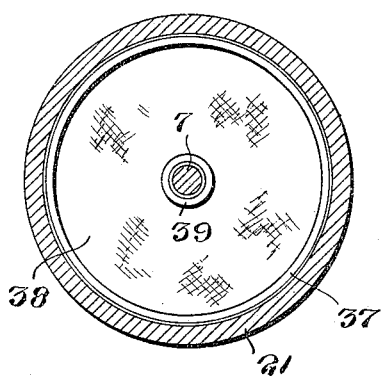 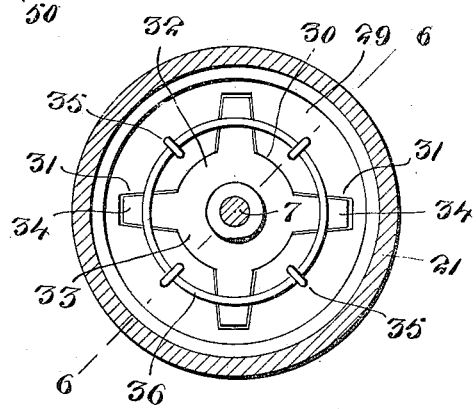
Inventor
J. N. Moody
Witnesses
E. R. Ruppert
Wm. ...
By Victor J. Evans
Attorney

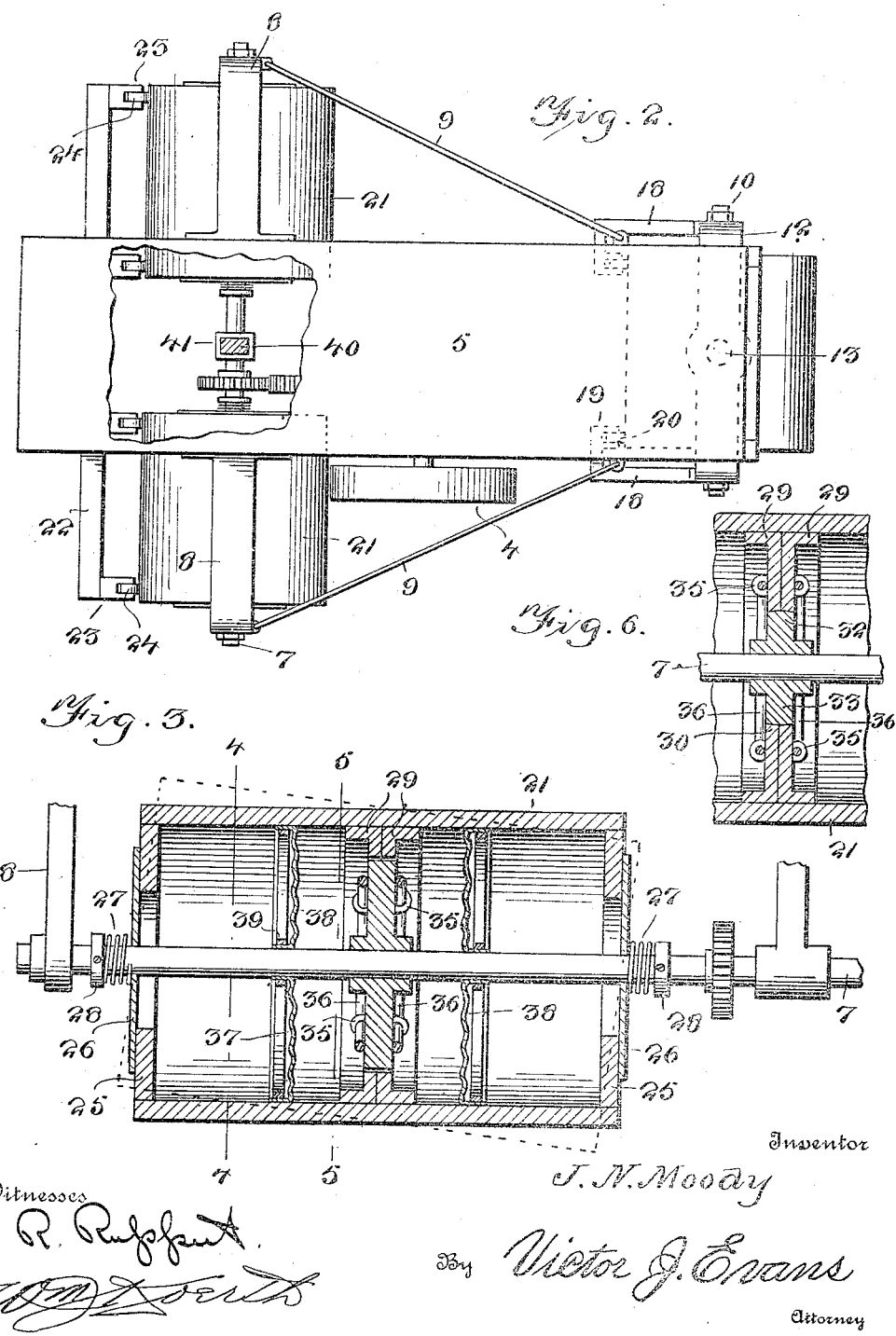

UNITED STATES PATENT OFFICE.

JAMES N. MOODY, OF WAYNESBORO, VIRGINIA.

TRACTOR.

1,204,299.　　　　Specification of Letters Patent.　　Patented Nov. 7, 1916.

Application filed October 29, 1915. Serial No. 58,650.

*To all whom it may concern:*

Be it known that I, JAMES N. MOODY, a citizen of the United States, residing at Waynesboro, in the county of Augusta and State of Virginia, have invented new and useful Improvements in Tractors, of which the following is a specification.

The present invention relates to improvements in tractors primarily adapted for use in propelling agricultural implements, such as plows, harrows and the like.

In carrying out my invention I propose to construct a tractor, propelled by any suitable or desired power which shall include a front or guide roller and rear drive rollers whereby the ground may be rolled to cover the furrows of the plow shares.

I also aim to construct a tractor including a guide roller arranged intermediate of rear drive rollers and to mount all of the rollers in such a manner that they may assume an inclination in a vertical direction to follow the uneven surfaces over which the tractor travels.

It is a still further object of the invention to construct a tractor having rollers for driving and guiding the same, all of the said rollers being arranged upon horizontal shafts, and journaled thereon in such a manner as to permit any of the said rollers assuming an inclination in a vertical direction, with respect to the said shafts, each independent of the other.

It is a still further object of the invention to construct a tractor of the class described which shall embody the desirable features of simplicity, efficiency and durability.

A still further object of the invention is to provide a tractor with a guide roller arranged intermediate and forward of two drive rollers, to journal all of the said rollers so that the same will be susceptible to an oscillatory movement in a vertical direction, and to provide the same with means for retaining the said rollers against movement in a horizontal direction.

With the above objects in view, and others which will appear as the nature of the invention is more fully understood the invention resides in the construction, combination and operative arrangement of parts set forth in the following description and falling within the scope of the appended claims.

The essential features of the invention involved in the provision of my improved tractor, are necessarily susceptible to a wide scope of structural modifications, but satisfactory illustrative embodiments of the same are shown in the accompanying drawings, in which—

Figure 1 is a side elevation of the improvement. Fig. 2 is a top plan view of the same, parts being broken away, parts being shown in section. Fig. 3 is an enlarged central longitudinal sectional view through one of the rollers. Fig. 4 is a transverse sectional view approximately on the line 4—4 of Fig. 3. Fig. 5 is a similar sectional view approximately on the line 5—5 of Fig. 3, and Fig. 6 is a sectional view approximately on the line 6—6 of Fig. 5. Fig. 7 is a detail view illustrating the means which may be employed for holding one of the rollers against longitudinal movement.

In carrying out my invention I provide a body 1, preferably constructed of I beams having a suitable floor upon which the motor rests. As the motive power may be derived from steam, gasolene, or electricity, I do not deem it necessary to enter into details of the same, but illustrate one form of an engine, indicated by the numeral 2. This engine has its drive shaft 3 provided upon one or both of its ends with a fly wheel 4, and this wheel may, when the tractor is halted, be employed for driving suitable machines, a belt being arranged upon the said fly wheel. The engine is protected by a suitable cab 5 arranged upon the body 1, and in the present instance I have illustrated the drive shaft 3 as provided with a toothed wheel 6 which meshes with a train of gear wheels for propelling the drive shaft 7. Of course the engine can be hitched to the drive shaft in any other desired or preferred manner, and the ends of the driven shaft 7 are journaled in suitable supports 8 which are secured to the side members of the frame 1 and which project laterally therefrom. The members 8 are provided with brace rods 9 which are also connected with the sides of the body or frame 1.

The numeral 10 designates the axle for the front and guide roller 11, the said axle being journaled in a suitable yoke 12 which is centrally and pivotally connected with the body or frame 1. The yoke 12 is adapted to be revolved upon its pivot indicated by the numeral 13 by the usual chains 14 which are mounted or wound upon a suitable shaft or drum 15 provided with the usual threaded portion adapted to be actuated by a worm upon the shaft 16 of the turning wheel 17. As the above structure is well known in the art, the same has not been illustrated in detail, the threaded portion of the shaft of the drum not being shown.

Arranged upon the vertical members of the yoke 12 is a rearwardly extending arm 18, each of the said arms having their free ends extending inwardly and supporting each a frame 19 having a plurality of roller members 20 journaled thereon. These rollers are arranged to contact centrally with the rear of the roller 11 and to hold the said roller against movement in a longitudinal direction, as will hereinafter be more fully understood.

The rear or drive rollers are indicated by the numerals 21, and it is to be understood that the front or guide roller 11 is arranged centrally of the said rear rollers.

The body 1, at the rear portion thereof is provided with a depending member or frame 22, the said member 22, having, at spaced intervals, inwardly extending members 23, the said members having their ends widened and provided with a plurality of rollers 24, the said rollers being, of course, journaled upon the said members 23, and each series of rollers arranged to contact with the guide rollers 21 adjacent the opposite ends thereof, and to assist in holding the said guide rollers against movement in a longitudinal or horizontal direction, which movement would be ordinarily permitted by the arrangement of parts now to be described.

As both the drive rollers and the guide roller are of a similar construction and are mounted upon their respective shafts or axles in a similar manner, a description of one of the said rollers may be understood as equally applicable to the remaining rollers. Each of the rollers comprises a hollowed member having its opposite ends provided with flanges 25. The openings in the flanges are normally closed by flat disks 26, and these disks are forced against the flanged ends 25 through the medium of springs 27 and arranged upon the shaft or axle of the rollers. A tension of the springs is regulated through the medium of adjustable collars 28. Each of the hollow rollers has centrally arranged therein two abutting flanged rings 29—29, and the flanges of the said rings are secured to the rollers. The central bore or opening of each of the rings provides a concaved wall 30, and the flat body portions of each of the rings formed with right angularly arranged slots 31, the end walls provided by the same being also concaved. The opening is adapted to receive the central rounded body portion 32 of a member 33 that is secured to the shaft or axle. The periphery of the member 33 is convex so as to be snugly received within the concaved portion 30 of the ring member 29, and projecting from the said periphery at right angles with respect to the body 33 are arms or fingers 34 which are received in the slots 31, and the ends of these fingers are convexed to be received in the concaved end walls of the slots 31.

By constructing the member 29 of two sections it will be noted that the member 33 may be readily arranged upon the said sections 29 before the sections are forced into contacting relation with each other, and also that by providing the convexed surfaces upon the member 33 and the arms thereof which engage in the concaved walls provided in the member 29 the roller can readily assume an inclined position with relation to the horizontal straight shaft or axle to accommodate itself to the undulating surfaces over which the tractor is propelled. In order to retain the member 33 in a line with the sides of the member 29, or in other words in a perfectly vertical position, I provide the opposite faces of the member 29 with spaced staples 35 which retain the spring ring members 36 thereon, the said springs 36 contacting with the opposite sides of the arms 34, as clearly shown in the drawings.

It is essential that dust and dirt be prevented from contacting with the parts just described, and in order to prevent this I provide annular bands 37 disposed adjacent the members 29 and 33, the said bands forming frames for flexible partitions 38, the said partitions preferably having their central openings through which the shaft or axle passes provided with metallic sleeves 39. Depending centrally from the body 1 is an arm 40, having its ends provided with a bearing 41 through which the central portion of the driven shaft 7 passes and whereby the central portion of the said shaft is supported.

In Fig. 7 I have illustrated a slight modification. The roller is indicated by the numeral 50 and is arranged upon the shaft 51 in a manner substantially similar to that previously described, the ends of the said roller being partly opened to permit of the said roller assuming an angle with relation to the shaft. In lieu of the plates 26 and the spring members for forcing the plates against the ends of the rollers, I arrange upon the vertical supports 52 for the shaft 51, inwardly extending arms arranged in spaced pairs and indicated by the numeral 51. These arms terminate a suitable distance from the ends of the rollers and are provided with a shaft 54 upon which is journaled a cone-shaped roller 55, and these rollers are adapted to contact with the roller 50 when the latter is tilted and arranged at an angle upon the shaft 51 to hold the same against sliding in a longitudinal direction upon the shaft.

From the above description taken in connection with the drawings the advantages of my construction will, it is thought be perfectly apparent to those skilled in the art to which such inventions appertain without further detailed description.

Having thus described the invention what is claimed is:—

1. In a tractor or the like, a shaft, a roller for the shaft, said roller being hollow and centrally provided with a ring member, a member upon the shaft engaging with the ring member to cause the roller to rotate with the shaft and to permit of the roller tilting upon the shaft, and connecting means between said shaft and said ring member.

2. In a tractor or the like, a hollow roller having flanged ends, a shaft passing centrally through the roller, spring pressed members on the shaft closing the open ends of the roller, said roller having a central ring member, the inner periphery of which being concaved, said ring having angularly arranged slots which enter the inner periphery thereof, a member secured to the shaft, said member including a central portion having its periphery convexed to receive the concaved periphery of the ring, said member having fingers received in the slots of the ring, and spring means for retaining said member upon the ring.

3. In a tractor or the like, a hollow roller, a shaft passing centrally through the roller, a peripheral rounded member secured to the shaft disposed centrally in the roller, an element secured in the roller and receiving said member, and spring means for retaining said member in said element.

4. In a tractor or the like, a hollow roller, a shaft passing centrally through the roller, a peripherally rounded member secured to the shaft and disposed centrally in the roller, an element secured in the roller and receiving said member, spring means for retaining said member in said element, fabric partitions in the roller, and spring pressed means for closing the open ends of the roller.

5. In a tractor or the like, a hollow roller, a shaft passing through the roller, a member provided with laterally extending arms upon the shaft, a member having angular slots upon the roller and receiving the shaft member and arms thereof, spring means for retaining the members associated, fabric partitions in the roller, to the opposite sides of said member, spring pressed means for closing the ends of the roller, and revoluble members contacting with the rear face of the roller, as and for the purpose set forth.

In testimony whereof I affix my signature in presence of two witnesses.

JAMES N. MOODY.

Witnesses:
Mrs. Ernest De Forrest Palmer,
A. D. Pennybacker.

Copies of this patent may be obtained for five cents each, by addressing the "Commissioner of Patents, Washington, D. C."